(12) United States Patent
Song et al.

(10) Patent No.: US 12,442,744 B2
(45) Date of Patent: Oct. 14, 2025

(54) APPARATUS AND METHOD FOR CALIBRATING A SHEAR TEST TOOL

(71) Applicant: ASMPT SINGAPORE PTE. LTD., Singapore (SG)

(72) Inventors: Keng Yew Song, Singapore (SG); Zui Hong Lee, Singapore (SG); Jian Min Chen, Chengdu (CN); Mow Huat Goh, Singapore (SG); Kien Kia Tan, Singapore (SG)

(73) Assignee: ASMPT SINGAPORE PTE. LTD., Singapore (SG)

( * ) Notice: Subject to any disclaimer, the term of this patent is extended or adjusted under 35 U.S.C. 154(b) by 385 days.

(21) Appl. No.: 17/975,676

(22) Filed: Oct. 28, 2022

(65) Prior Publication Data

US 2023/0137302 A1 May 4, 2023

(30) Foreign Application Priority Data

Oct. 29, 2021 (CN) .......................... 202111272241.8

(51) Int. Cl.
*G01N 3/62* (2006.01)
*G01B 5/14* (2006.01)
*G01N 3/24* (2006.01)
*G01N 19/04* (2006.01)

(52) U.S. Cl.
CPC ..................................... *G01N 3/62* (2013.01)

(58) Field of Classification Search
CPC ... G01B 5/14; G01B 5/30; G01N 3/04; G01N 19/08; G01N 19/02; G01N 19/04; G01N 3/62; G01N 3/08; G01N 3/34; G01N 3/00; G01N 3/24; G01G 23/012; G01L 25/003; B25B 23/14; B25J 15/0061; E02D 1/022; E21B 17/1021; H01L 21/66
See application file for complete search history.

(56) References Cited

U.S. PATENT DOCUMENTS

2005/0193829 A1* 9/2005 Brinz ........................ G01N 3/08
73/794

* cited by examiner

*Primary Examiner* — Brandi N Hopkins
(74) *Attorney, Agent, or Firm* — OSTROLENK FABER LLP

(57) ABSTRACT

An apparatus for calibrating a shear test tool utilizes a resilient pivot mechanism to improve accuracy and reliability of the force calibration. The apparatus includes a fixed element, a pivotable element configured to be rotatable relative to the fixed element, and a resilient pivot mechanism coupled between the fixed element and the pivotable element to form a pivot. The pivotable element is rotatable about the pivot to lift a weight coupled to the pivotable element when the shear test tool applies a force on the pivotable element in order to rotate the pivotable element and lift the weight.

20 Claims, 5 Drawing Sheets

APPARATUS AND METHOD FOR CALIBRATING A SHEAR TEST TOOL

FIELD OF THE INVENTION

The invention generally relates to shear tests conducted on interconnect bonds formed on electronic devices, such as a wire bond formed on the electronic device, or a die bond formed between a die and a substrate, and more specifically to calibrating a shear test tool for such bonded joints.

BACKGROUND

During semiconductor assembly and packaging, shear tests may be performed to determine the bond strength of interconnect bonds or the degree of adhesion between a die and a substrate. It is important to test the mechanical strength of these interconnect bonds in electronic devices so as to accurately evaluate the quality of these bonds so as to determine whether the bond strength is sufficient and/or whether bonding parameters need to be modified.

To accurately measure bond strength using a shear test tool, it is necessary to calibrate the shear test tool regularly so that compensation and/or correction actions may be carried out on the shear test tool when the test result shows any variation and deviation from a predetermined allowable tolerance. In prior art force calibration devices for shear test tools, bearing pivots are typically used to form a pivot between a fixed element and a pivotable element to conduct calibration. During such force calibration, bearing friction in mechanical bearings may cause wear and tear on the bearings, which in turn will reduce the lifespan of the bearings and force calibration reliability. Further, the calibration results determined using conventional force calibration devices may not be accurate since the bearing friction is not constant and may vary due to the use of different weights during the calibration process. In addition, the bearing components may become rusted and corroded over time if they contain iron. Although lubricants may be used to reduce friction and rust, this would incur greater maintenance effort and higher costs.

It would therefore be beneficial to design a new force calibration device for a shear test tool which may avoid at least some of the aforesaid shortcomings faced by conventional force calibration devices.

SUMMARY OF THE INVENTION

It is thus an object of the invention to seek to provide an improved force calibration apparatus that utilizes a resilient pivot mechanism so as to improve the lifespan and reliability of the force calibration apparatus.

According to a first aspect of the present invention, there is provided an apparatus for calibrating a shear test tool. The apparatus comprises a fixed element, a pivotable element configured to be rotatable relative to the fixed element, and a resilient pivot mechanism coupled between the fixed element and the pivotable element to form a pivot such that the pivotable element is rotatable about the pivot to lift a weight coupled to the pivotable element when the shear test tool applies a force on the pivotable element in order to rotate the pivotable element and lift the weight.

In the apparatus for calibrating a shear test tool, a resilient pivot mechanism is used to replace the bearing pivot used in prior art force calibration devices. Thus, no friction will be produced between the resilient pivot mechanism and other components of the force calibration device. The problems caused by bearing friction in prior art force calibration devices can therefore be avoided accordingly. The lifespan and the reliability of the force calibration device will be significantly improved, and the calibration results will be more accurate despite usage over time. Further, no lubricants are required to reduce friction and rust and therefore the maintenance effort and costs will be reduced.

In some embodiments, the pivotable element may define a first length along a horizontal direction and a second length along a vertical direction relative to the pivot, the weight is coupled to an end of the first length distal from the pivot, and the shear test tool is operative to apply a substantially horizontal force on an end of the second length distal from the pivot to rotate the pivotable element and lift the weight.

In one embodiment, the resilient pivot mechanism comprises a cross spring pivot mechanism. The cross spring pivot mechanism may be formed by a first spring sheet having an opening and a second spring sheet which is sized to pass through the opening of the first spring sheet, the first and second spring sheets being arranged at an angle to each other. Each of the first and the second spring sheets has a first edge fixed to the fixed element and a second edge fixed to the pivotable element such that each of the first and the second spring sheets is deflectably in contact with both the fixed element and the pivotable element. Preferably, the first spring sheet and the second spring sheet are mounted orthogonally with respect to each other.

In another embodiment, the resilient pivot mechanism comprises a first pair of spring sheets and a second pair of spring sheets. The fixed element has opposite first and second sides located along an interface between the fixed element and the pivotable element. The first pair of spring sheets is mounted on the first side of the fixed element and the second pair of spring sheets is mounted on the second side of the fixed element. Each of the spring sheets is deflectably in contact with both the fixed element and the pivotable element. Preferably, respective spring sheets of the first pair of spring sheets are mounted orthogonally with respect to each other, and respective spring sheets of the second pair of spring sheets are mounted orthogonally with respect to each other.

In some embodiments, the apparatus may further comprise a coupling device configured to detachably couple the weight to the pivotable element. In one embodiment, the coupling device may comprise a hook from which the weight is configured to hang.

In some embodiments, the shear test tool may comprise a shear test bar and a force sensor coupled to the shear test bar. The force sensor is operative to measure the force applied to the pivotable element with the shear test bar in order to rotate the pivotable element and lift the weight. In one embodiment, the shear test bar may have a tip with a tapered shape.

In some embodiments, the apparatus may further comprise a processor which is operatively connected to the force sensor. The processor is configured to determine a relatively constant force measured with the force sensor after the weight has been lifted from a rest position by the force exerted with the shear test bar.

According to a second aspect of the present invention, there is provided a method for calibrating a shear test tool. The method comprises: providing a calibration apparatus which comprises a fixed element, a pivotable element configured to be rotatable relative to the fixed element, and a resilient pivot mechanism coupled between the fixed element and the pivotable element to form a pivot such that the pivotable element is rotatable about the pivot; and applying, with the shear test tool, a force on the pivotable element such that the pivotable element is rotated about the pivot to lift a weight coupled to the pivotable element.

In some embodiments, the pivotable element defines a first length along a horizontal direction and a second length along a vertical direction relative to the pivot. Accordingly, the method further comprises: coupling the weight to an end of the first length distal from the pivot; and wherein the step of applying the force on the pivotable element comprises: applying, with the shear test tool, a substantially horizontal force on an end of the second length distal from the pivot to rotate the pivotable element and lift the weight.

In one embodiment, the resilient pivot mechanism comprises a cross spring pivot mechanism. The cross spring pivot mechanism may be formed by a first spring sheet having an opening and a second spring sheet which is sized to pass through the opening of the first spring sheet, the first and second spring sheets being arranged at an angle to each other. Preferably, the first spring sheet and the second spring sheet are mounted orthogonally with respect to each other.

In another embodiment, the resilient pivot mechanism comprises a first pair of spring sheets and a second pair of spring sheets. The fixed element has opposite first and second sides located along an interface between the fixed element and the pivotable element. The first pair of spring sheets is mounted on the first side of the fixed element and the second pair of spring sheets is mounted on the second side of the fixed element. Each of the spring sheets is deflectably in contact with both the fixed element and the pivotable element. Preferably, the respective spring sheets of the first pair of spring sheets are mounted orthogonally with respect to each other, and respective spring sheets of the second pair of spring sheets are mounted orthogonally with respect to each other.

In some embodiments, the shear test tool may comprise a shear test bar and a force sensor coupled to the shear test bar. The method further comprises: moving the shear test bar to apply the force to the pivotable element and measuring, with the force sensor, the force applied to the pivotable element with the shear test bar in order to rotate the pivotable element and lift the weight.

In some embodiments, the method may further comprise: determining, with a processor or a computer system, a relatively constant force measured with the force sensor after the weight has been lifted from the rest position by the force exerted on the pivotable element by the shear test bar.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which.

In the drawings, like parts are denoted by like reference numerals.

DETAILED DESCRIPTION OF THE PREFERRED EMBODIMENTS OF THE INVENTION

Figure 1A:
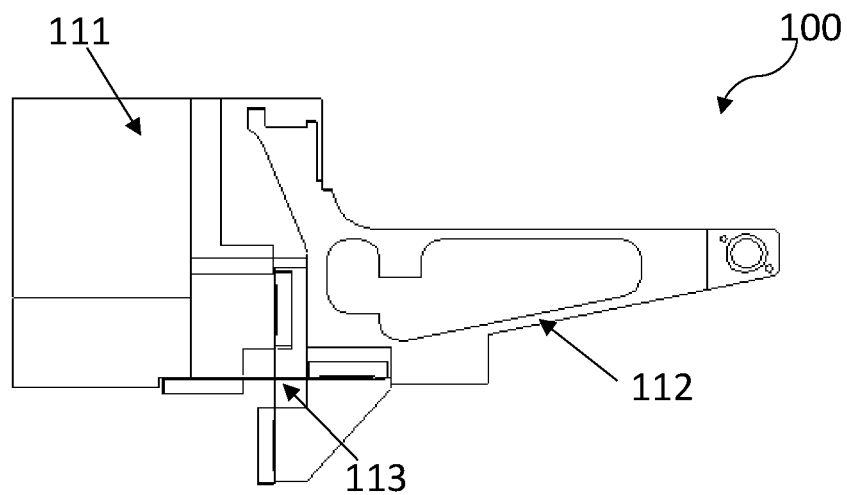
FIG. 1A is a cross-sectional view of an apparatus for calibrating a shear test tool according to some embodiments of the invention.
Figure 1B:
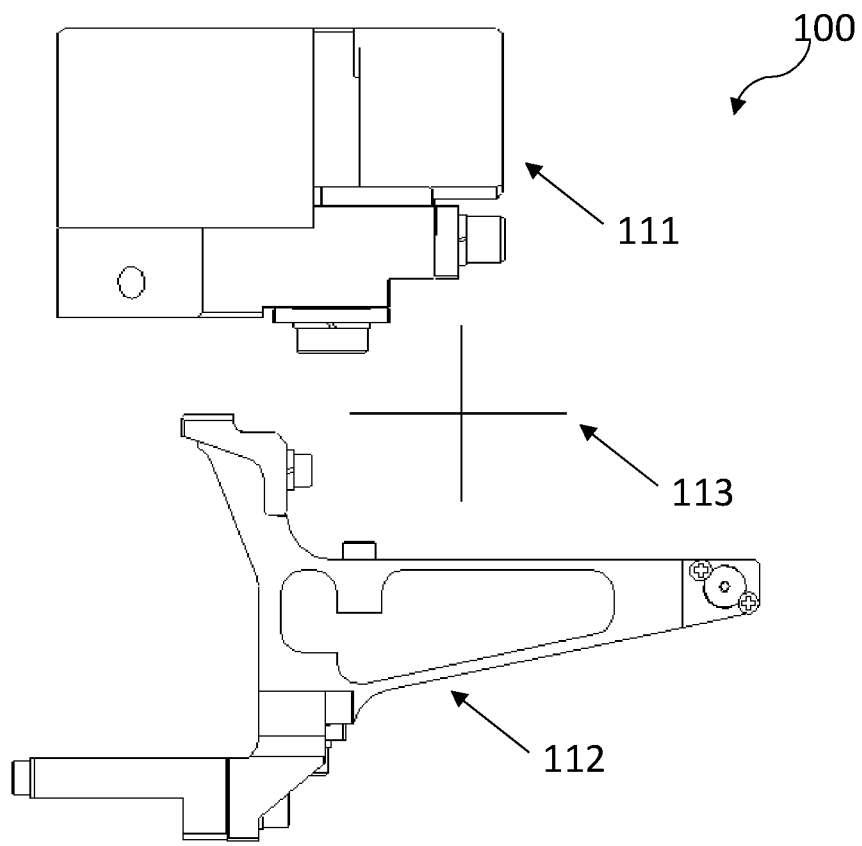
FIG. 1B is a cross-sectional view of the apparatus as shown in FIG. 1A wherein fixed and pivotable elements of the apparatus have been separated.

FIG. 1A is a cross-sectional view of an apparatus 100 for calibrating a shear test tool according to some embodiments of the invention. As shown in FIG. 1A, the apparatus 100 comprises a fixed element 111, a pivotable element 112 and a resilient pivot mechanism 113. The pivotable element 112 is configured to be rotatable relative to the fixed element 111. FIG. 1B is a cross-sectional view of the apparatus 100 wherein fixed and pivotable elements 111, 112 of the apparatus have been separated. The resilient pivot mechanism 113 is coupled between the fixed element 111 and the pivotable element 112 to form a pivot such that the pivotable element 112 is rotatable about the pivot to lift a weight coupled to the pivotable element 112 when the shear test tool applies a horizontally-directed force on the pivotable element 112 in order to rotate the pivotable element 112 and lift the weight.

Figure 2A:
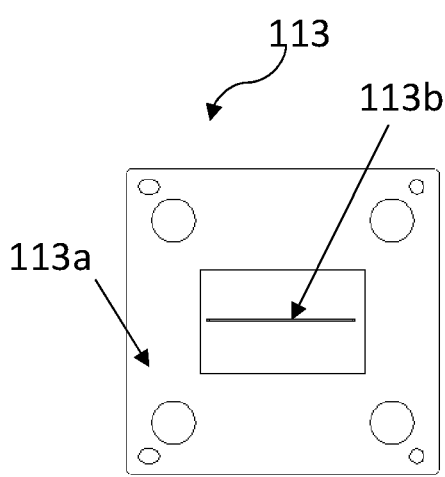
FIG. 2A and FIG. 2B show front and isometric views respectively of a resilient pivot mechanism according to a first embodiment of the invention.
Figure 2B:
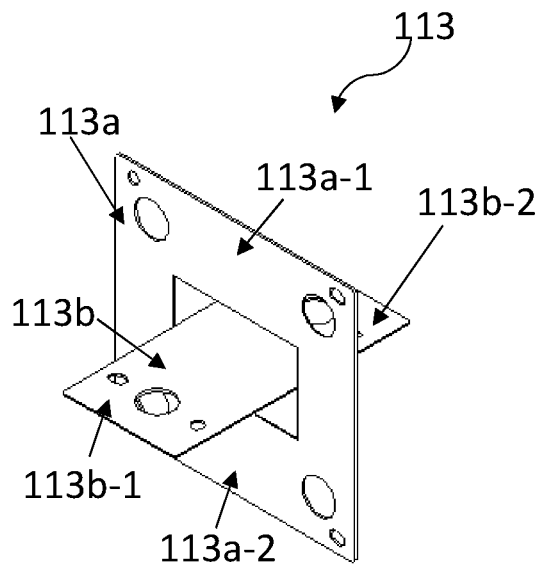
Figure 2C:
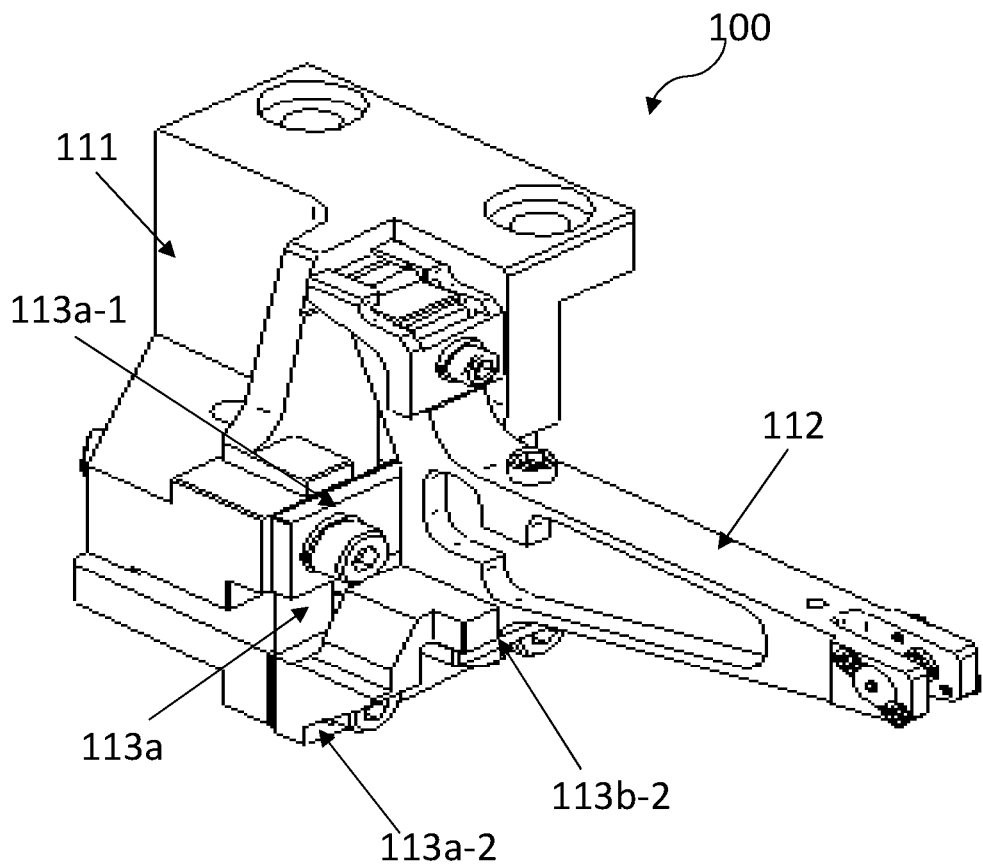
FIG. 2C is a perspective view of the apparatus for calibrating a shear test tool according to the first embodiment of the invention.

FIG. 2A and FIG. 2B show front and isometric views respectively of the resilient pivot mechanism 113 according to a first embodiment of the invention. FIG. 2C is a perspective view of the apparatus 100 according to the first embodiment of the invention. In this embodiment, the resilient pivot mechanism 113 comprises a cross spring pivot mechanism which is formed by a first spring sheet 113a having an opening and a second spring sheet 113b which is sized to pass through the opening of the first spring sheet 113a. When the first and second spring sheets 113a and 113b are installed between the fixed element 111 and the pivotable element 112, the first and second spring sheets 113a and 113b are mounted orthogonally with respect to each other, as shown in FIG. 2C.

In this embodiment, the first spring sheet 113a is coupled between the fixed element 111 and the pivotable element 112 by a first coupling means including four pairs of bolts and nuts, and the second spring sheet 113b is coupled between the fixed element 111 and the pivotable element 112 by a second coupling means including two pairs of bolts and nuts. Referring to FIG. 2A to FIG. 2C, the first spring sheet 113a has a first edge 113a-1 fixed to the fixed element 111 and a second edge 113a-2 fixed to the pivotable element 112 such that the first spring sheet 113a is deflectably in contact with both the fixed element 111 and the pivotable element 112. Similarly, the second spring sheet 113b has a first edge 113b-1 fixed to the fixed element 111 and a second edge 113b-2 fixed to the pivotable element 112 such that the second spring sheet 113b is deflectably in contact with both the fixed element 111 and the pivotable element 112. It should be noted that the first coupling means and/or the second coupling means in this embodiment are provided for illustration only. In other embodiments, different coupling means may be used to install the first and second spring sheets 113a, 113b between the fixed element 111 and the pivotable element 112.

It should be appreciated that the components and structure of the cross spring pivot mechanism in this embodiment are provided for illustration only. The cross spring pivot mechanism may have different structure and components, e.g., the cross spring pivot mechanism may be an integrally-formed component having two spring sheets which are unitary and arranged orthogonally with respect to each other.

Figure 3A:
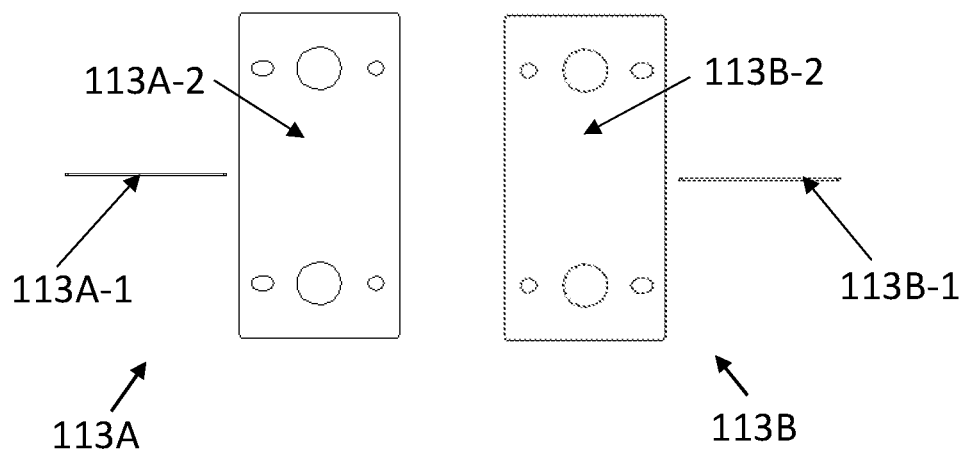
FIG. 3A shows a resilient pivot mechanism which comprises two pairs of spring sheets according to a second embodiment of the invention.
Figure 3B:
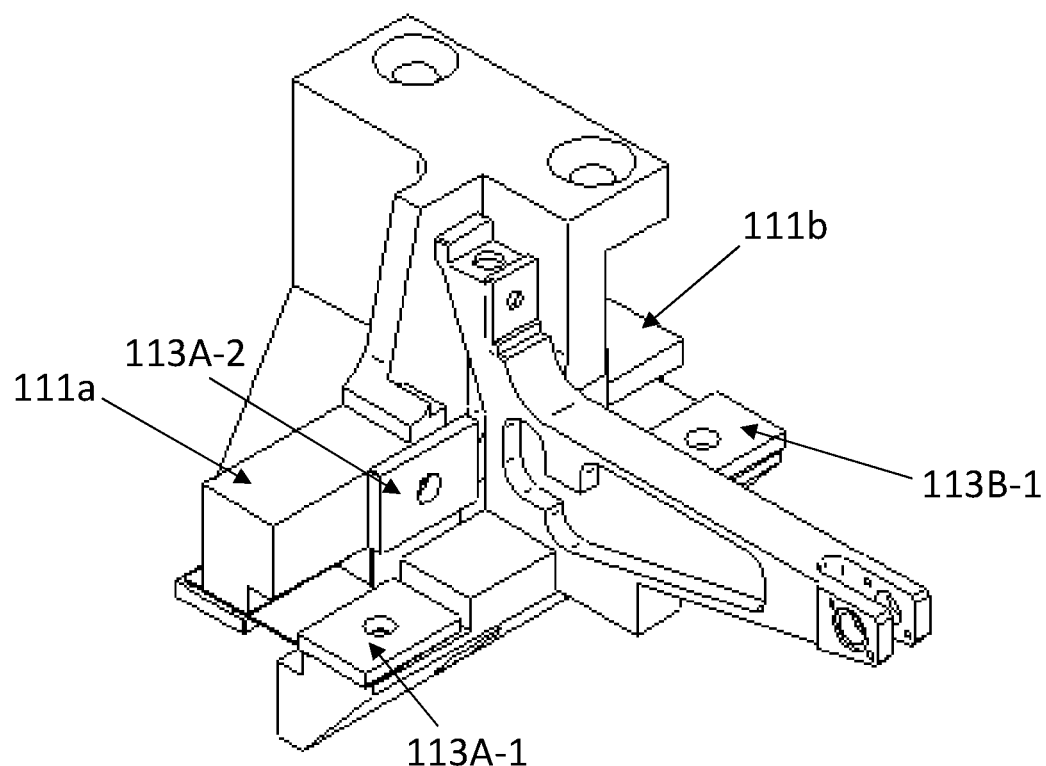
FIG. 3B and FIG. 3C show respective perspective and front views of the apparatus for calibrating a shear test tool according to the second embodiment of the invention.
Figure 3C:
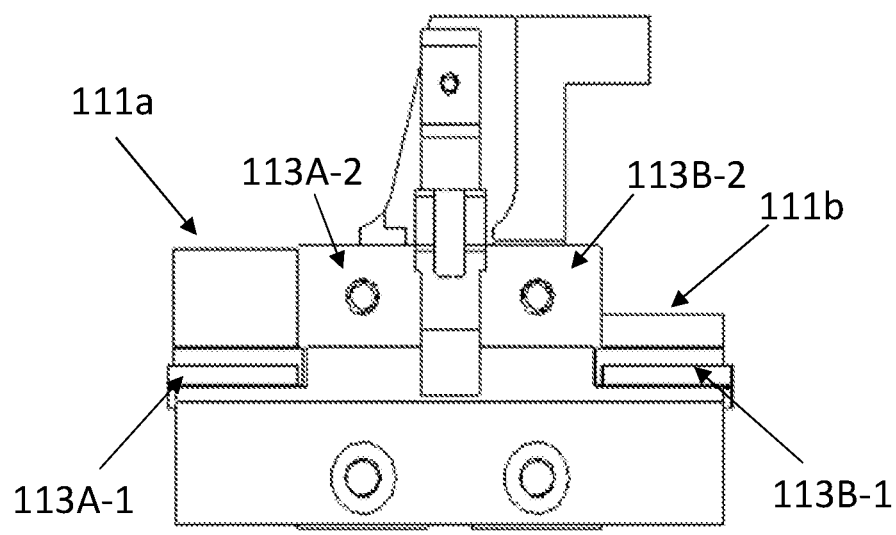

In a second embodiment of the invention, the resilient pivot mechanism 113 comprises a first pair of spring sheets 113A and a second pair of spring sheets 113B. FIG. 3A shows the two pairs of spring sheets 113A and 113B according to the second embodiment of the invention. Each pair of the spring sheets include two spring sheets installed between the fixed element 111 and the pivotable element 112 orthogonally with respect to each other. As shown in FIG. 3A, the first pair of spring sheets 113A includes a first spring sheet 113A-1 and a second spring sheet 113A-2, and the second pair of spring sheets 113B include a first spring sheet 113B-1 and a second spring sheet 113B-2. FIG. 3B and FIG. 3C show respective perspective and front views of the apparatus 100 according to the second embodiment of the invention. As shown in FIG. 3B and FIG. 3C, the fixed element 111 has opposite first and second sides 111a and 111b, located along an interface between the fixed element 111 and the pivotable element 112. The first pair of spring sheets 113A is mounted on the first side 111a of the fixed element 111 and the second pair of spring sheets 113B is mounted on the second side 111b of the fixed element 111. Each spring sheet is deflectably in contact with both the fixed element 111 and the pivotable element 112. The two spring sheets 113A-1 and 113A-2 are mounted orthogonally with respect to each other, and the two spring sheets 113B-1 and 113B-2 are mounted orthogonally with respect to each other.

Figure 4:
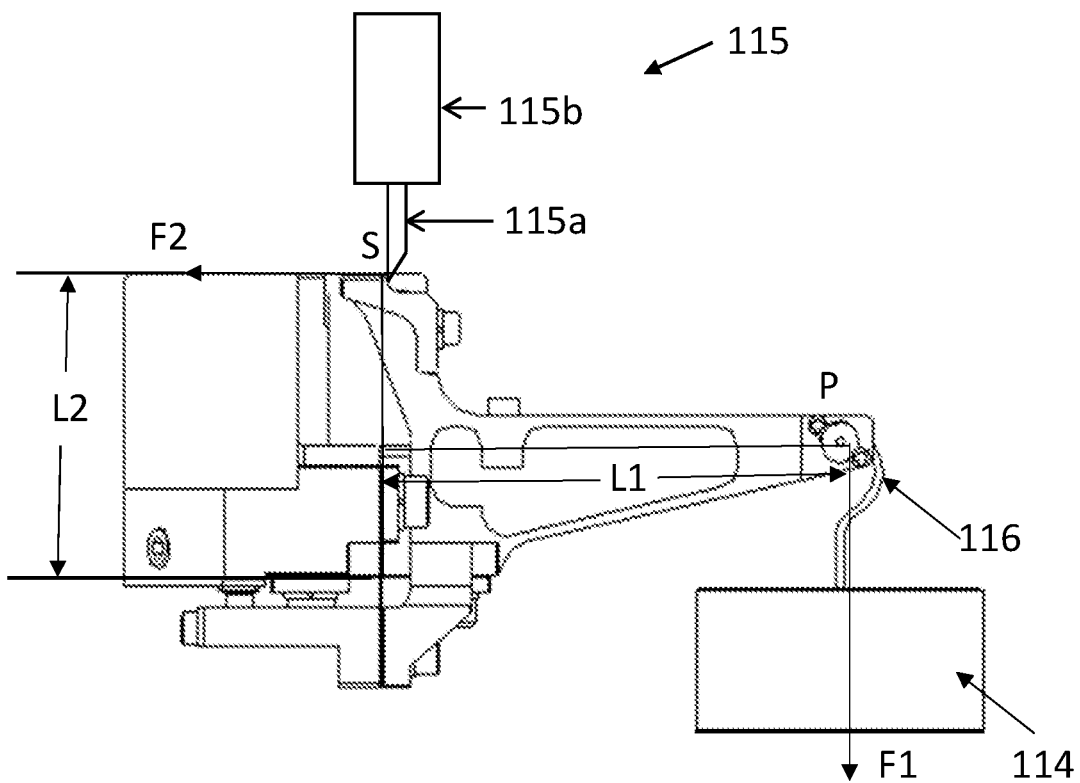
FIG. 4 is a cross-sectional view of the apparatus for calibrating a shear test tool when it is used to calibrate a shear test tool according to one embodiment of the invention.

FIG. 4 is a cross-sectional view of the apparatus 100 when it is used to calibrate a shear test tool 115 according to one embodiment of the invention. In use, a weight 114 with a predetermined weight value, e.g. a constant weight or a dead mass, is coupled to the pivotable element 112 by a coupling device. In this embodiment, the coupling device comprises a hook 116 from which the weight 114 is configured to hang. It should be noted that the weight 114 may be coupled to the pivotable element 112 by using any means in other embodiments of the invention, as long as a known vertically-directed force F1 is applied to the pivotable element 112 by the weight 114. For example, the weight 114 may be directly attached to a bottom/top surface of the pivotable element 112 either with or without any additional coupling device.

The shear test tool 115 includes a shear test bar 115a and a force sensor 115b coupled to the shear test bar 115a. The shear test tool 115 is moved such that the shear test bar 115a is in contact with the pivotable element 112 and exerts a force on the pivotable element 112 to rotate the pivotable element 112 in order to lift the weight 114. The force sensor 115b is operative to measure a reaction force applied by the pivotable element 112 against the shear test bar 115a when the latter is rotating the pivotable element 112 to lift the weight 114. The shear test bar 115a may have a tip with a tapered shape to minimize contact between the shear test bar 115a and a surface to which the interconnect bond is formed or located.

As shown in FIG. 4, in this embodiment, the pivotable element 112 defines a first length L1 along a horizontal direction relative to the pivot and a second length L2 along a vertical direction relative to the pivot. The weight 114 is coupled to an end of the first length L1 distal from the pivot and the shear test tool 115 is operative to apply a substantially horizontal force F2 on an end of the second length distal from the pivot to rotate the pivotable element 112 in order to lift the weight 114. In this embodiment, the end of the first length L1 distal from the pivot is located at one end P of an arm of the pivotable element 112. However, in other embodiments, the position of the end of the first length L1 distal from the pivot may be different, e.g., it may be positioned at a point which is not at the end P.

In some embodiments of the invention, the apparatus 100 may further include a processor or any computing system which is operatively connected to the force sensor 115b and configured to determine a relatively constant force measured by using the force sensor 115b after the weight 114 has been lifted from its resting position by the force exerted on the pivotable element 112 by the shear test bar 115a.

Figure 5:
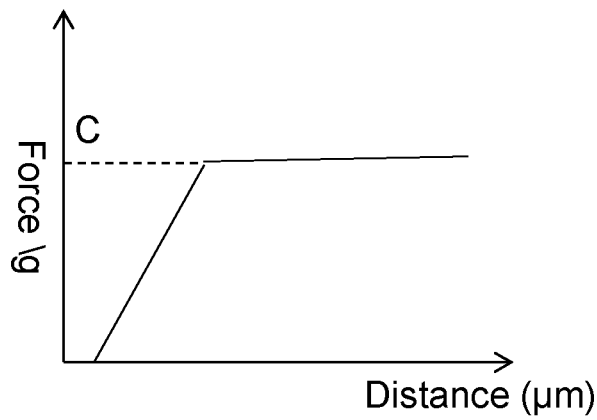
FIG. 5 is a line graph illustrating the calibration results of a shear test tool using the apparatus for calibrating a shear test tool according to the first embodiment of the invention.

FIG. 5 is a line graph illustrating the calibration results of the shear test tool 115 using the apparatus 100 according to the first embodiment of the invention. As shown in FIG. 5, the reaction force measured by the force sensor 115b increases significantly with the distance moved by the shear test bar 115a along the horizontal direction towards the pivotable element 112 until the pivotable element 112 starts to rotate and the weight 114 is lifted. Once the processor determines that the force measured by the force sensor 115b remains relatively constant, i.e., there is no significant increase in the force measured by the force sensor 115b with further movement of the shear test bar 115a along the horizontal direction, a value of the relatively constant force C is taken as a calibration result for the calibration of the shear test tool 115. It should be noted that the force measured by the force sensor 115b will not become a real constant value during the calibration although it may not obviously increase after the weight 114 is lifted. The reason is that to ensure the shear test bar 115b moves along the horizontal direction with a constant velocity, the force applied to the pivotable element 112 will still slowly increase with further movement of the shear test bar 115b as a pivot spring force will increase with further deformation of the spring sheets of the resilient pivot mechanism 113. This increase in the measured force caused by the further deformation of the resilient pivot mechanism 113 is not obvious as the spring constant of the resilient pivot mechanism 113 is a very small value, e.g. $0.017 g/um$.

In order to calibrate the shear test tool 115 accurately, a plurality of weights with different values may be used to conduct the calibration of the shear test tool 115.

Figure 6:
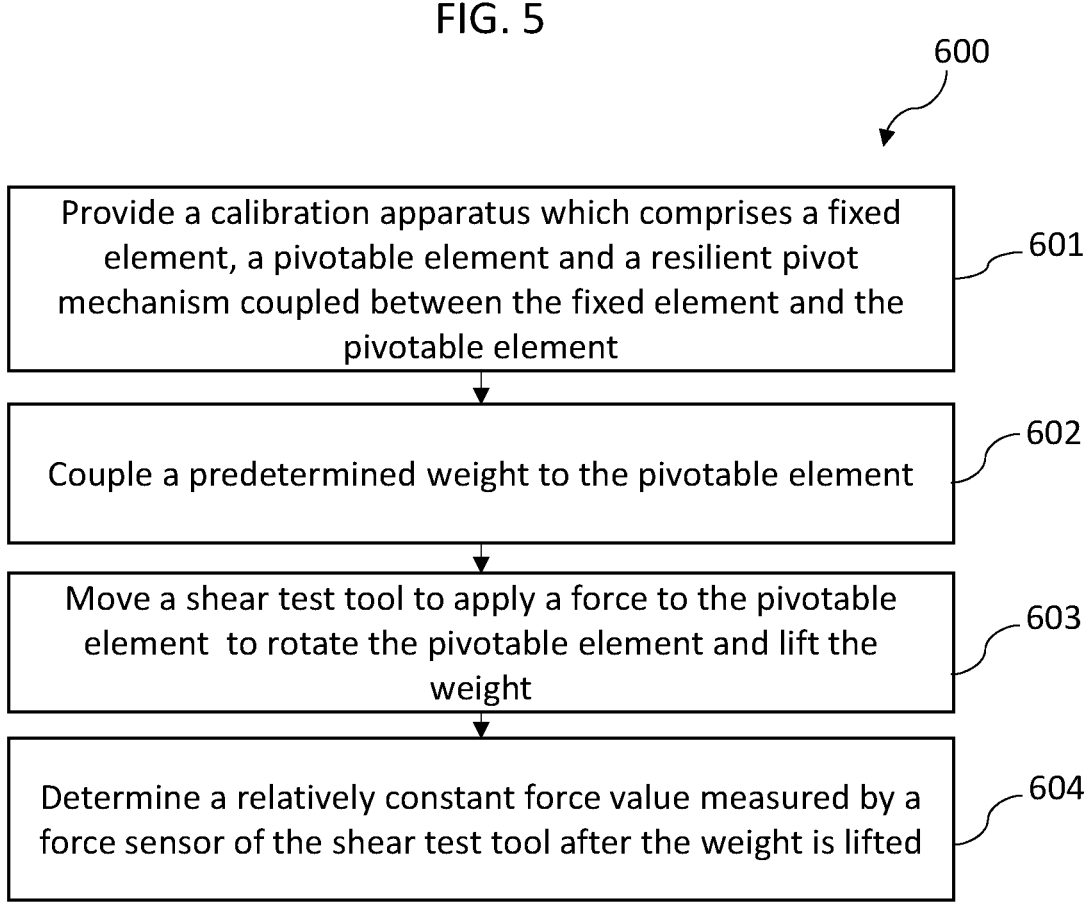
FIG. 6 is a flow chart illustrating a method for calibrating a shear test tool according to one embodiment of the invention.

FIG. 6 is a flow chart illustrating a method 600 for calibrating a shear test tool using the apparatus 100 according to one embodiment of the invention.

At Step 601, a calibration apparatus 100 is provided which comprises a fixed element 111, a pivotable element 112 configured to be rotatable relative to the fixed element 111, and a resilient pivot mechanism 113 coupled between the fixed element 111 and the pivotable element 112.

At Step 602, a weight 114 having a predetermined value is coupled to the pivotable element 112.

At Step 603, a shear test tool 115 is moved relative to the pivotable element 112 so that a shear test bar 115a of the shear test tool 115 contacts the pivotable element 112, and applies a force to rotate the pivotable element 112 and to lift the weight 114.

In this embodiment, the shear test tool 115 may be moved downwards first until the shear test bar 115a is positioned at a predetermined height, and the shear test tool 115 is then moved along the horizontal direction at a constant speed till the shear test bar 115a is in contact with the pivotable element 112 at a predetermined position, e.g., the end of the second length L2 distal from the pivot defined by the pivotable element 112. Once the shear test bar 115a contacts the pivotable element 112, a substantially horizontal force is exerted on the pivotable element 112 to rotate the pivotable element 112 and to lift the weight 114.

At Step 604, a processor or a computing system which is operatively connected to the shear test tool 115 determines a relatively constant force measured by a force sensor 115b of the shear test tool 115 after the weight 114 has been lifted by the force exerted by the shear test bar 115a on the pivotable element 112.

Specifically, during movement of the shear test bar 115a along the horizontal direction, the processor or the computing system may record the forces measured by the force sensor 115b as the distance moved by the shear test bar 115a increases along the horizontal direction. A value of a relatively constant force is determined based on the recorded forces.

To accurately calibrate the shear test tool 115, a plurality of weights with different weight values may be used to conduct the steps at Step 602 to Step 604.

As will be appreciated from the above description, the apparatus and method for calibrating a shear test tool provided in the described embodiments of the invention utilize a resilient pivot mechanism to form a pivot between the fixed element and the pivotable element such that when a force is exerted on the pivotable element by a shear test tool, the pivotable element is rotated about the pivot to lift a weight. Compared to prior art force calibration devices formed with bearing pivots, the problems caused by the bearing friction in various mechanical bearings will be avoided since friction is not produced by the resilient pivot mechanism installed between the fixed element and the pivotable element. Specifically, the lifespan and reliability of the force calibration apparatus will be significantly improved, since no lubricants are required to reduce friction and rust, the maintenance effort and costs of the force calibration apparatus will be reduced. Further, more accurate calibration results will be obtained, especially over long-term use, since the inaccuracy caused by the bearing frictions is avoided.

Table 1 below illustrates the calibration results obtained using the apparatus 100 according to the first embodiment of the invention. Weights having different values are used to conduct the calibration process. It can be seen from the results shown in Table 1 that the force ratios obtained from the apparatus 100 based on the measurement results are relatively constant.

TABLE 1

| Weight (Gram) | Force (N/g) | Ratio |
|---|---|---|
| 5.000 | 8.600 | 1.7201 |
| 10.000 | 17.210 | 1.7210 |
| 25.000 | 43.084 | 1.7234 |
| 50.000 | 86.259 | 1.7252 |
| 100.000 | 172.523 | 1.7253 |

Although the present invention has been described in considerable detail with reference to certain embodiments, other embodiments are possible. Therefore, the spirit and scope of the appended claims should not be limited to the description of the embodiments contained herein.

The invention claimed is:

1. An apparatus for calibrating a shear test tool, the apparatus comprising:
   a fixed element,
   a pivotable element configured to be rotatable relative to the fixed element, and
   a resilient pivot mechanism disposed between the fixed element and the pivotable element and coupled to both the fixed element and the pivotable element to form a pivot such that the pivotable element is rotatable about the pivot to lift a weight coupled to the pivotable element when the shear test tool applies a force on the pivotable element in order to rotate the pivotable element and lift the weight.

2. The apparatus according to claim 1, wherein:
   the pivotable element defines a first length along a horizontal direction and a second length along a vertical direction relative to the pivot,
   the weight is coupled to an end of the first length distal from the pivot, and
   the shear test tool is operative to apply a substantially horizontal force on an end of the second length distal from the pivot to rotate the pivotable element and lift the weight.

3. The apparatus according to claim 1, wherein the resilient pivot mechanism comprises a cross spring pivot mechanism.

4. The apparatus according to claim 3, wherein the cross spring pivot mechanism is formed by a first spring sheet having an opening and a second spring sheet which is sized to pass through the opening of the first spring sheet, the first and second spring sheets being arranged at an angle to each other.

5. The apparatus according to claim 4, wherein each of the first and the second spring sheets has a first edge fixed to the fixed element and a second edge fixed to the pivotable element such that each of the first and the second spring sheets is deflectably in contact with both the fixed element and the pivotable element.

6. The apparatus according to claim 4, wherein the first spring sheet and the second spring sheet are mounted orthogonally with respect to each other.

7. The apparatus according to claim 1, wherein the fixed element has opposite first and second sides located along an interface between the fixed element and the pivotable element, and the resilient pivot mechanism comprises a first pair of spring sheets which is mounted on the first side of the fixed element, and a second pair of spring sheets which is mounted on the second side of the fixed element, each spring sheet being deflectably in contact with both the fixed element and the pivotable element.

8. The apparatus according to claim 7, wherein the respective spring sheets of the first pair of spring sheets are mounted orthogonally with respect to each other, and respective spring sheets of the second pair of spring sheets are mounted orthogonally with respect to each other.

9. The apparatus according to claim 1, further comprising a coupling device configured to detachably couple the weight to the pivotable element.

10. The apparatus according to claim 9, wherein the coupling device comprises a hook from which the weight is configured to hang.

11. The apparatus according to claim 1, wherein the shear test tool comprises a shear test bar and a force sensor coupled to the shear test bar, the force sensor being operative to measure the force applied to the pivotable element by the shear test bar in order to rotate the pivotable element and lift the weight.

12. The apparatus according to claim 11, further comprising a processor which is operatively connected to the force sensor, the processor being configured to determine a relatively constant force measured by the force sensor after the weight has been lifted from a rest position by the force exerted by the shear test bar.

13. The apparatus according to claim 11, wherein the shear test bar has a tip with a tapered shape.

14. A method for calibrating a shear test tool, the method comprising:
providing a calibration apparatus which comprises a fixed element, a pivotable element configured to be rotatable relative to the fixed element, and a resilient pivot mechanism disposed between the fixed element and the pivotable element and coupled to both the fixed element and the pivotable element to form a pivot such that the pivotable element is rotatable about the pivot; and
applying, with the shear test tool, a force on the pivotable element such that the pivotable element is rotated about the pivot to lift a weight coupled to the pivotable element.

15. The method according to claim 14, wherein the pivotable element defines a first length along a horizontal direction and a second length along a vertical direction relative to the pivot, wherein the method further comprises:
coupling the weight to an end of the first length distal from the pivot; and
wherein the step of applying the force on the pivotable element comprises: applying, with the shear test tool, a substantially horizontal force on an end of the second length distal from the pivot in order to rotate the pivotable element and lift the weight.

16. The method according to claim 14, wherein the resilient pivot mechanism comprises a cross spring pivot mechanism.

17. The method according to claim 16, wherein the cross spring pivot mechanism is formed by a first spring sheet having an opening and a second spring sheet which is sized to pass through the opening of the first spring sheet, the first and second spring sheets being arranged at an angle to each other.

18. The method according to claim 16, further comprising: determining, with a processor or a computing system, a relatively constant force measured by the force sensor after the weight has been lifted from a rest position by the force exerted by the shear test bar.

19. The method according to claim 14, wherein the fixed element has opposite first and second sides located along an interface between the fixed element and the pivotable element, and the resilient pivot mechanism comprises a first pair of spring sheets which is mounted on the first side of the fixed element, and a second pair of spring sheets which is mounted on the second side of the fixed element, each spring sheet is deflectably in contact with both the fixed element and the pivotable element.

20. The method according to claim 14, wherein the shear test tool comprises a shear test bar and a force sensor coupled to the shear test bar, and the method further comprises: moving the shear test bar to apply the force to the pivotable element and measuring, with the force sensor, the force applied to the pivotable element by the shear test bar in order to rotate the pivotable element and lift the weight.

* * * * *